(12) United States Patent
Bosma et al.

(10) Patent No.: US 11,825,807 B2
(45) Date of Patent: Nov. 28, 2023

(54) MILKING SYSTEM

(71) Applicant: DELAVAL HOLDING AB, Tumba (SE)

(72) Inventors: Epke Bosma, Tumba (SE); Andrés Lundh, Tumba (SE)

(73) Assignee: DeLaval Holding AB, Tumba (SE)

( * ) Notice: Subject to any disclaimer, the term of this patent is extended or adjusted under 35 U.S.C. 154(b) by 0 days.

(21) Appl. No.: 17/775,177

(22) PCT Filed: Nov. 3, 2020

(86) PCT No.: PCT/SE2020/051058
§ 371 (c)(1),
(2) Date: May 6, 2022

(87) PCT Pub. No.: WO2021/091459
PCT Pub. Date: May 14, 2021

(65) Prior Publication Data
US 2022/0378005 A1 Dec. 1, 2022

(30) Foreign Application Priority Data
Nov. 8, 2019 (SE) .................................... 1951282-1

(51) Int. Cl.
A01J 7/02 (2006.01)
A01J 5/007 (2006.01)

(52) U.S. Cl.
CPC ............. A01J 7/022 (2013.01); A01J 5/007 (2013.01)

(58) Field of Classification Search
CPC .... A01J 7/022; A01J 5/007; A01J 7/02; A01J 7/027; A01J 5/00; A01J 7/025
See application file for complete search history.

(56) References Cited

U.S. PATENT DOCUMENTS 2,800,134 A * 7/1957 Merritt .................... A01J 7/022
134/171
6,089,242 A 7/2000 Buck
2004/0118432 A1 6/2004 Kenowski et al.

FOREIGN PATENT DOCUMENTS

EP 0 951 822 10/1999
EP 1 186 229 3/2002
(Continued)

OTHER PUBLICATIONS

International Search Report for PCT/SE2020/051058 dated Feb. 10, 2021, 3 pages.
(Continued)

Primary Examiner — Magdalena Topolski
Assistant Examiner — Spencer T Callaway
(74) Attorney, Agent, or Firm — NIXON & VANDERHYE

(57) ABSTRACT

A milking system configured to milk animals includes at least one milking station, a milk tank, a transport conduit, a valve arrangement, and a cleaning arrangement that includes a delivery arrangement configured to deliver a first liquid into the milk transport conduit and to deliver a second liquid into the milk transport conduit, a pump, a controller configured to control the delivery arrangement, and a detector configured to detect that a delivery of the first liquid into milk transport conduit has ended. The detector is connected to the controller, which is configured, as a response to a signal from the detector that the delivery of the first liquid has ended, to activate the delivery arrangement to deliver the second liquid into the milk transport conduit subsequently to the ending of the delivery of the first liquid while there is a column of first liquid in the milk transport conduit.

8 Claims, 3 Drawing Sheets

(56) References Cited

FOREIGN PATENT DOCUMENTS

| EP | 3139730 | 3/2017 | |
|----|---------|--------|---|
| GB | 1141308 | 1/1969 | |
| GB | 1 420 720 | 1/1976 | |
| WO | WO-2009029041 A1 * | 3/2009 | .............. A01J 7/022 |
| WO | 2010/036102 | 4/2010 | |
| WO | 2015/170970 | 11/2015 | |

OTHER PUBLICATIONS

Written Opinion of the ISA for PCT/SE2020/051058 dated Feb. 10, 2021, 7 pages.
Swedish Search Report for SE1951282-1 dated Jun. 4, 2020, 3 pages.

* cited by examiner

MILKING SYSTEM

This application is the U.S. national phase of International Application No. PCT/SE2020/051058 filed Nov. 3, 2020 which designated the U.S. and claims priority to SE 1951282-1 filed Nov. 8, 2019, the entire contents of each of which are hereby incorporated by reference.

TECHNICAL FIELD

The present invention relates to a milking system configured to milk animals, said system comprising: at least one milking station, a milk tank, a transport conduit extending from the milking station to the milk tank, a valve arrangement configured to control the flow of milk from the milking station to the milk tank, a cleaning arrangement configured to introduce a liquid into the milk transport conduit and to transport the liquid through at least a major part of the milk transport conduit, said cleaning arrangement comprising a delivery arrangement configured to deliver a first liquid into the milk transport conduit and to deliver a second liquid into the milk transport conduit, a pump for pumping the first and second liquid through the milk transport conduit, and a control unit configured to control the delivery arrangement.

BACKGROUND

Cleaning arrangements for the cleaning of milk transport conduits in milk arrangements are known. Such cleaning arrangements may comprise different kinds of cleaning liquid delivery arrangements, arranged to pump a cleaning liquid through at least a major part of the milk transport conduit. Different cleaning liquids may be used, such as water with added acid, water with an added alkali, water with added disinfectant, and clean water. The cleaning arrangement may also comprise a device for air purging of the milk transport conduit for the purpose of pushing remaining liquid through and out of the milk transport conduit.

The milk transport conduit may be of substantial length, in particular in the case of a large industrial milking system in which a plurality of milking stations equipped with milking robots are connected to the milk transport conduit. In such cases, the length of the milk transport conduit to which the milking stations are connected may be several hundred meters. Pumps of the individual milking stations pump the milk from the stations into the milk transport conduit and towards the tank.

A typical cleaning process starts with disconnection of the milking stations from the milk transport conduit and emptying the milk transport conduit from milk by means of introduction of pressurized air. This is referred to as air purge. The cleaning process may include a pre-rinse step in which lukewarm water is pumped into the milk transport conduit. The pre-rinse step is ended by emptying the milk transport conduit from the water by means of introduction of pressurized air into the conduit (air purge). The pre-rinse step is followed by a main washing step. In the main washing step water mixed with a detergent is pumped through the milk transport conduit until the latter is assumed to be clean. Also the main washing step is ended by an air purge in which all remaining water-detergent mixture is pushed through and out of the milk transport conduit. There may also be further cleaning steps, and each time a step is ended, the remaining liquid is removed by means of air purge. Each air purge takes substantial time since the milk transport conduit is of substantial length.

The cleaning process necessitates a temporary stop of the milk production, or requires an auxiliary system in order to maintain milk production during cleaning, and it is therefore important to make the cleaning process time as short as possible. It is thus an object of the present invention to present a milking system comprising a cleaning arrangement which enables a time efficient cleaning of a milk transport conduit of the milking system.

SUMMARY

The object of the invention is achieved by means of a milking system configured to milk animals, said system comprising:
  at least one milking station,
  a milk tank,
  a transport conduit extending from the milking station to the milk tank,
  a valve arrangement configured to control the flow of milk from the milking station to the milk tank,
  a cleaning arrangement configured to introduce a liquid into the milk transport conduit and to transport the liquid through at least a major part of the milk transport conduit, said cleaning arrangement comprising
    a delivery arrangement configured to deliver a first liquid into the milk transport conduit and to deliver a second liquid into the milk transport conduit,
    a pump for pumping the first and second liquid through the milk transport conduit, and
    a control unit configured to control the delivery arrangement, said milking system being characterized in that it comprises determining means for determining that a delivery of the first liquid into milk transport conduit has ended, which determining means is connected to the control unit, and that the control unit is configured, as a response to a signal from the determining means that the delivery of the first liquid has ended, to activate the delivery arrangement to deliver the second liquid into the milk transport conduit subsequently to the ending of the delivery of the first liquid while there is a column of first liquid in the milk transport conduit.

By starting pumping the second liquid through the milk transport conduit while there is still a substantial amount of the first liquid into the milk transport conduit, instead of waiting until all the first liquid has exited the milk transport conduit, the stand still time period of the milking system may be substantially reduced.

According to one embodiment, the milking is characterized in that, during a cleaning sequence, the first liquid forms a column in the milk transport conduit, and that the control unit is configured to activate the delivery arrangement such that a front end of a column of the second liquid in the milk transport conduit is in contact with a tail end of the column of the first liquid. Accordingly, there is no empty space between the first liquid and the second liquid.

According to one embodiment, one of said first and second liquid comprises only water and the other of said first and second liquid comprises water with an added chemical cleaning composition. The added composition is typically any one of an acid, an alkali or a disinfectant.

According to one embodiment, the milking system is characterized in
  that the delivery arrangement is configured to deliver a third liquid into the milk transport conduit,
  that the milking system comprises determining means for determining that a delivery of the second liquid into the milk transport conduit has ended, which determining means is connected to the control unit, and that the control unit is configured, as a response to a signal from the determining means that the delivery of the second liquid has ended, to activate the delivery arrangement to deliver the third liquid into the milk transport conduit subsequently to the ending of the delivery of the second liquid while there is a column of the second liquid in the milk transport conduit, and that the first liquid comprises water with a first added chemical cleaning composition, the second liquid comprises only water, and that the third liquid comprises water with an added second chemical cleaning composition.

According to one embodiment, the first chemical cleaning solution comprises an acid or an alkali, and the second chemical cleaning solution comprises a disinfectant.

According to one embodiment, the volume of the second liquid is substantially less than the volume of the first liquid and substantially less than the volume of the third liquid and acts as a volume for physically separating the column of the first liquid from the column of the third liquid.

According to one embodiment, a front of a column of the second liquid formed in the milk transport conduit is in contact with a tail of a column of the first liquid formed in the milk transport conduit and a front of a column of the third liquid formed in the milk transport conduit is in contact with the tail of the column of the second liquid.

According to one embodiment, said pump is a centrifugal pump, and the means for determining that a delivery of the first liquid into the first inlet has ended comprises said centrifugal pump. The centrifugal pump will stop automatically as a response to the ending of delivery of the first liquid and the control unit is configured to initiate the delivery of the second liquid as a response to the automatic stopping of the centrifugal pump.

According to one embodiment, said determining means comprises a flow sensor arranged in the delivery arrangement. The flow sensor may be arranged in any suitable part of the cleaning arrangement, such as in association to a conduit thereof leading to the milk transport conduit, or in association to a tray or container from which liquid is forwarded to such a conduit.

According to one embodiment, the delivery arrangement comprises a tray via which the liquid is conducted to the milk transport conduit, and said determining means comprises a level meter arranged in said tray.

BRIEF DESCRIPTION OF THE DRAWING

Exemplifying embodiments of the drawing will be described with reference to the annexed drawing, on which.

DETAILED DESCRIPTION OF EMBODIMENTS

Figure 1:
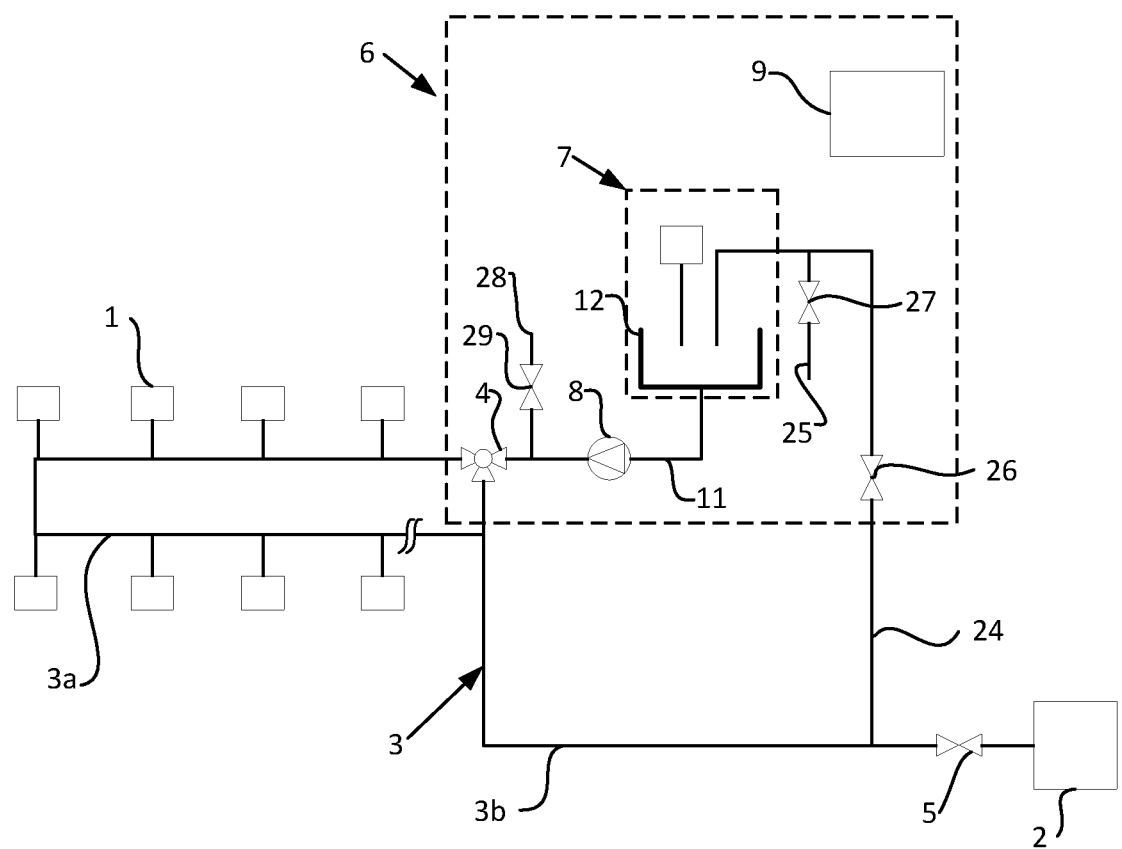
FIG. 1 is a schematic representation of a milking system according to the invention.

FIG. 1 shows a milking system configured to milk animal. The milking system comprises plurality of milking stations 1, a milk tank 2, a transport conduit 3 extending from the milking station 1 to the milk tank 2.

The milking stations 1 comprise milking robots configured to automatically milk animals that enter the respective milking station 1. The milk tank 2 is a cooling tank in which large volumes of milk are gathered in connection to harvesting of milk in the milking system. The cooling tank is emptied on a regular basis, for example by means of milk lorries.

The milk transport conduit 3 is a conduit to which the milking stations are connected. The milk transport conduit 3 comprises a loop 3a to which the milking stations are connected, and a part 3b which extends from the loop 3a to the tank 2. The loop 3a has a length in the order of 100 meters or more, while the further part 3b may be considerably shorter, for example 10 meters. The loop 3a often has a length in the order of 100 m or more, but shorter than 100 m is of course also possible.

A valve arrangement 4, 5 is configured to control the flow of milk from the milking station 1 to the milk tank 2. In the drawing, only two valves 4, 5 are provided. It should be understood that there may be less or more valves in the valve arrangement. The valves 4, 5 may be controlled by a control unit 9 belonging to a cleaning arrangement 6 or to any other control unit forming part of a control arrangement for controlling the operation of the milking system.

The milking system also comprises a cleaning arrangement 6 configured to introduce a liquid into the milk transport conduit 3 and to transport the liquid through at least a major part of the milk transport conduit 3. The cleaning arrangement 6 comprises a delivery arrangement 7 configured to deliver at least a first liquid, and a second liquid into the milk transport conduit 3. The delivery arrangement 7 will be further described later with reference to FIG. 2. The cleaning arrangement 6 forms a circuit together with the milk transport conduit 3.

The cleaning arrangement 6 further comprises a pump 8 for pumping the liquids through the milk transport conduit 3, and a control unit 9 configured to control the delivery arrangement 7. The control arrangement may comprise a control unit provided with suitable hardware and software.

The control unit 9 may form part of a control arrangement for controlling the operation of the milking system. It may comprise one or more physical entities.

The cleaning arrangement further comprises determining means for determining that a delivery of a first liquid into milk transport conduit 3 has ended, which determining means is connected to the control unit 9. The control unit 9 is configured to control the operation of the pump 8.

In the embodiment shown, said pump 8 is a centrifugal pump, and the means for determining that a delivery of the first liquid into the first inlet has ended comprises said centrifugal pump 8. The delivery arrangement 7 may comprise a tray 12 in which liquid is gathered before being conducted via a first conduit 11 to the pump 8. In such a case, ending of delivery may be referred to as when the tray has been emptied from liquid. The control unit 9 is configured to start delivery of the second liquid as a response to an automatic inactivation of the pump 8 caused by lack of liquid flowing through the pump 8.

The amount of liquid to be delivered by the delivery unit 7 may be preset in accordance with a predetermined cleaning program. The pump 8, or any other suitable sensor or flow meter or level meter, may be configured to measure the amount of liquid delivered by the delivery arrangement.

The determining means is configured to detect when the delivered liquid has reached a position in the cleaning arrangement 6 in which a second liquid can be delivered, whereby a front of a column of the second liquid will be in contact with a tail of a column of the first liquid.

Figure 3:
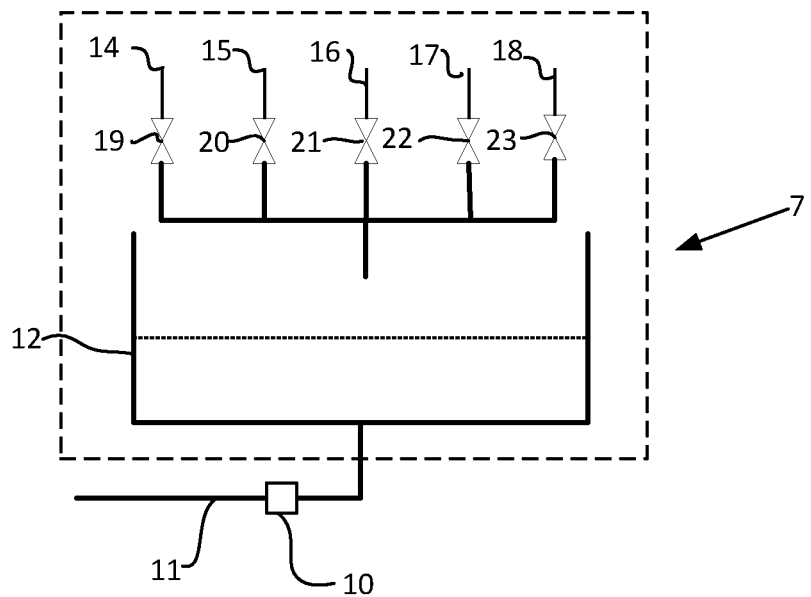
FIG. 3 is a detailed, but yet schematic, representation of an alternative embodiment.

According to an alternative embodiment, shown in FIG. 3, said determining means is a flow meter 10 arranged in a conduit 11 forming part of the cleaning arrangement 6 and leading from the delivery arrangement to the pump 8.

Figure 4:
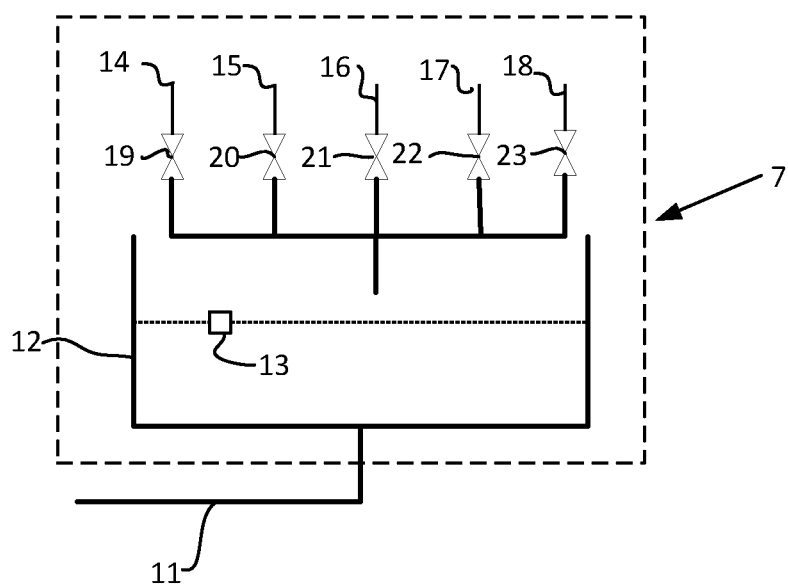
FIG. 4 is yet another representation of an alternative embodiment.

According to yet another embodiment, shown in FIG. 4, the delivery arrangement 7 comprises a tray 12 via which the liquid is conducted to the milk transport conduit 3, and the determining means comprises a level meter 13 arranged in said tray 12. When the level meter 13 reaches the bottom of the tray 12, it is an indication that delivery of the first liquid has ended.

The control unit 9 is configured, as a response to a signal from the determining means 8, 10, 13 that the delivery of the first liquid has ended, to activate the delivery arrangement 7 to deliver the second liquid into the milk transport conduit 3 subsequently to the ending of the delivery of the first liquid. As a result of the operation of the pump 8, the first liquid will form a column in the milk transport conduit 3. The control unit 9 is configured to activate the delivery arrangement 7 such that a front end of a column of the second liquid in the milk transport conduit 3 follows the column of the first liquid without intermediate spacing. Thereby a front end of the column of the second liquid will be in contact with a tail end of the column of the first liquid.

The cleaning arrangement 6 comprises a first conduit 11 leading from the tray 12 to a controllable valve 4 of the valve arrangement, via which the first conduit 11 is connected to the milk transport conduit 3. The controllable valve 4 is controlled by the control unit 9. The cleaning arrangement also comprises a second conduit 24 leading from the milk transport conduit 3 to the tray 12 and configured to guide liquid that has passed through a major part of the milk transport conduit 3 back to the tray 12 (for circulation of liquid through the cleaning arrangement or to a waste line (indicated with 25 in FIG. 1). A controllable valve 26 controlled by the control unit 9 is arranged in the second conduit 22. There is also provided a further controllable valve 25 for controlling the flow from the second conduit 24 into the wasteline 25.

Figure 2:
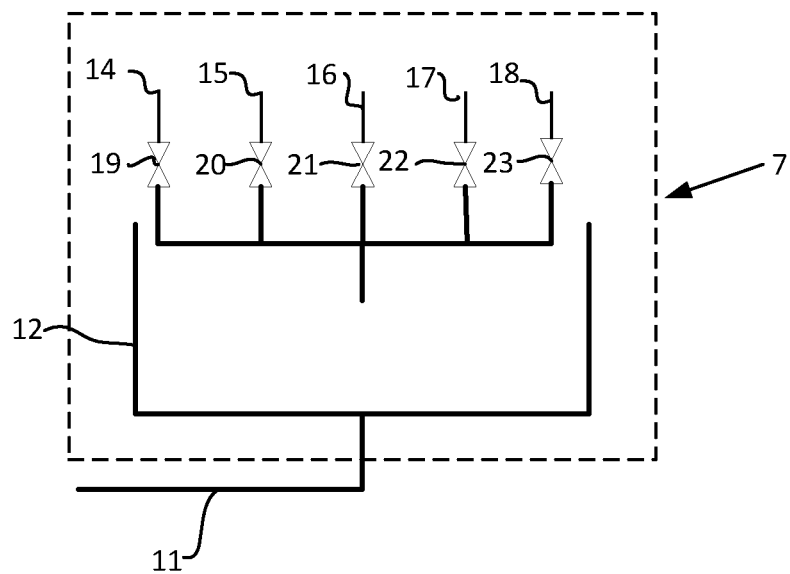
FIG. 2 is a detailed, but yet schematic, representation of a part of the milking system shown in FIG. 1.

FIG. 2 shows an exemplifying embodiment of the delivery arrangement 7. The delivery arrangement comprises a plurality of liquid sources 14, 15, 16, 17, 18. The liquid sources 14-18 comprises conduits configured to direct the liquid of the respective source into a tray 12, which also forms part of the delivery arrangement 7. Controllable valves 19, 20, 21, 22, 23 are provided and configured to control the flow of the respective liquid. The controllable valves 19-23 are connected to and controlled by the control unit 9. According to one embodiment, the first liquid source 14 is configured to deliver cold water, the second liquid source 15 is configured to deliver hot water, the third liquid source 16 is configured to deliver an acid, the fourth liquid source is configured to an alkali and the fifth liquid source is configured to deliver a disinfectant. By mixing the liquids from the liquid sources, different liquids to be pumped through the milk transport conduit 3 are formed. Mixing takes place in the tray 12, and is controlled by the control unit 9.

An air purge line 28, equipped with a controllable valve 29 controlled by the control unit 9 is connected to the first conduit 11, for the purpose of delivering pressurized air through the milk transport conduit 3, including the loop 3a.

According to one embodiment, the control unit 9 is configured to control the respective valves in such a way that the following cleaning sequence is performed:

a) disconnection/inactivation of milking stations from loop 3a, such that no further milk is pumped into milk transport conduit 3,
b) emptying the milk transport conduit 3 through air purge (valve 4 and valve 5 open, thereafter closing valve 5),
c) deliver predetermined amount of pure water into milk transport conduit 3 via delivery arrangement 7 and pump 8,
d) when pump 8 is inactivated due to no further water being pumped through it, deliver predetermined amount of water-detergent mixture via delivery arrangement 7 and restart pump 8. A front of a column of the water-detergent mixture will be in direct contact with a tail of a column of the pure water.
e) when pump 8 is inactivated due to no further water-detergent mixture being pumped through it, deliver predetermined amount of pure water via the delivery arrangement 7 and restart the pump 8. A front of a column of the pure water will be in direct contact with a tail of a column of the water-detergent mixture in the milk transport conduit 3.
f) when pump 8 is inactivated due to no further water being pumped through it, deliver predetermined amount of water-disinfectant mixture via delivery arrangement 7 and restart pump 8. A front of a column of the water-disinfectant mixture will be in direct contact with a tail of a column of the pure water.
g) when pump 8 is inactivated due to no further water-disinfectant mixture being pumped through it, deliver predetermined amount of pure water via the delivery arrangement 7 and the pump 8. A front of a column of the pure water will be in direct contact with a tail of a column of the water-disinfectant mixture in the milk transport conduit 3.
h) when pump 8 is inactivated due to no further water being pumped through it, empty the milk transport conduit from water by air purge.

The predetermined amount of water in step e) is considerably less the predetermined amount of water-detergent mixture in step d) and primarily acts as a buffer between the water-detergent mixture added in step d) and the water-disinfectant mixture added in step f).

It should be emphasized that the above sequence is only described by way of example and that other combinations of cleaning liquid orders may be applied. For example, when water-detergent mixtures are pumped through the milking system, the controllable valve 27 to the waste line 25 may be closed in order to enable circulation of the liquid in question through the first conduit 11, the milk transport conduit 3 and the second conduit 24.

The invention claimed is:

1. A milking system configured to milk animals, said system comprising:
   at least one milking station;
   a milk tank;
   a milk transport conduit extending from the milking station to the milk tank;
   a valve system configured to control the flow of milk from the milking station to the milk tank; and
   a cleaning system configured to introduce a plurality of liquids into the milk transport conduit, for cleaning the milk transport conduit, and to transport the plurality of liquids through at least a part of the milk transport conduit, said cleaning system comprising
   a pump,
   a delivery system via which the plurality of liquids is gathered, the pump being located downstream of the delivery system and connected to receive the plurality of liquids from the delivery system,
the delivery system configured to deliver, via the pump, a first liquid of the plurality of liquids into the milk transport conduit, to deliver, via the pump, a second liquid of the plurality of liquids into the milk transport conduit, and, to deliver a third liquid of the plurality of liquids into the milk transport conduit for said cleaning the milk transport conduit,
wherein the first liquid comprises water with a first added chemical cleaning composition, the second liquid comprises only water, and the third liquid comprises water with an added second chemical cleaning composition,
wherein the pump is configured to pump the first liquid, the second liquid, and the third liquid into and through the milk transport conduit for said cleaning the milk transport conduit,
a controller configured to control the delivery system, and
a detector configured to detect that a delivery, via the pump, of the first liquid into the milk transport conduit has ended and to detect that a delivery, via the pump, of the second liquid into the milk transport conduit has ended, the detector being connected to the controller,
wherein the controller is configured, as a response to a first signal from the detector that the delivery of the first liquid has ended, to activate the delivery system to deliver the second liquid, via the pump, into the milk transport conduit subsequently to the ending of the delivery of the first liquid while there is a column of first liquid in the milk transport conduit so that the pump starts pumping the second liquid through the milk transport conduit while the column of the first liquid is still in the milk transport conduit, and
the controller is further configured, as a response to a second signal from the detector that the delivery of the second liquid has ended, to activate the delivery system to deliver the third liquid, via the pump, into the milk transport conduit subsequently to the ending of the delivery of the second liquid while there is the column of the second liquid in the milk transport conduit so that the pump starts pumping the third liquid through the milk transport conduit while the column of the second liquid is still in the milk transport conduit.

2. The milking system according to claim 1, wherein, during a cleaning sequence, the first liquid defines the column in the milk transport conduit, and
the controller is configured to activate the delivery system such that a front end of a column of the second liquid in the milk transport conduit is in contact with a tail end of the column of the first liquid.

3. The milking system according to claim 1, wherein one of said first and second liquid comprises only water and the other of said first and second liquid comprises water with an added chemical cleaning composition.

4. The milking system according to claim 1, wherein the volume of the second liquid is less than the volume of the first liquid and less than the volume of the third liquid and acts as a volume for physically separating the column of the first liquid from the column of the third liquid.

5. The milking system according to claim 1, wherein said pump is a centrifugal pump, and the detector comprises said centrifugal pump.

6. The milking system according to claim 1, wherein the detector comprises a flow meter disposed in the delivery system.

7. The milking system according to claim 1, wherein,
the delivery system comprises a tray via which the plurality of liquids is gathered and via which the plurality of liquids is conducted to the milk transport conduit,
the pump being located downstream of the tray and connected to receive the plurality of liquids from the tray, and
said detector comprises a level meter disposed in said tray.

8. A milking system configured to milk animals, the system comprising:
at least one milking station;
a milk tank;
a milk transport conduit extending from the milking station to the milk tank;
a valve system configured to control the flow of milk from the milking station to the milk tank; and
a cleaning system configured to introduce a plurality of liquids into the milk transport conduit, for cleaning the milk transport conduit, and to transport the plurality of liquids through at least a part of the milk transport conduit, said cleaning system comprising
a pump,
a delivery system via which the plurality of liquids is gathered before being conducted to the pump, the pump being located downstream of the delivery system and connected to receive the plurality of liquids from the delivery system,
the delivery system configured to deliver, via the pump, a first liquid of the plurality of liquids into the milk transport conduit, to deliver, via the pump, a second liquid of the plurality of liquids into the milk transport conduit, and, to deliver a third liquid of the plurality of liquids into the milk transport conduit for cleaning the milk transport conduit,
wherein the first liquid comprises water with a first added chemical cleaning composition, the second liquid comprises only water, and the third liquid comprises water with an added second chemical cleaning composition,
wherein the pump is configured to pump the first liquid, the second liquid, and the third liquid into and through the milk transport conduit for said cleaning the milk transport conduit,
a controller configured to control the delivery system, and
a detector configured to detect when the delivered first liquid has reached a position in the cleaning system in which the second liquid is able to be delivered, and to detect that a delivery, via the pump, of the second liquid into the milk transport conduit has ended, the detector being connected to the controller,
wherein the controller is configured, as a response to a first signal from the detector that the delivered first liquid has reached the position in the cleaning system in which the second liquid is able to be delivered, to activate the delivery system to deliver, via the pump, the second liquid into the milk transport conduit such that a front of a column of the second liquid is in contact with a tail of the column of the first liquid, and
wherein the controller is further configured, as a response to a second signal from the detector that the delivered second liquid has reached the position in the cleaning system in which the third liquid is able to be delivered, to activate the delivery system to deliver, via the pump, the third liquid into the milk transport conduit such that a front of a column of the third liquid is in contact with a tail of the column of the second liquid.

\* \* \* \* \*